March 5, 1940.　　　　F. KASPAR　　　　2,192,551
ELECTRODE ASSEMBLY
Filed April 2, 1938

Inventor:
Frank Kaspar

Patented Mar. 5, 1940

2,192,551

UNITED STATES PATENT OFFICE 2,192,551

ELECTRODE ASSEMBLY

Frank Kaspar, Cicero, Ill., assignor to General Scientific Corporation, Chicago, Ill., a corporation of Illinois Application April 2, 1938, Serial No. 199,596

2 Claims. (Cl. 176—126)

The present invention relates to gaseous conduction tubes such as are used in the well-known neon sign advertising displays. This invention is particularly directed to an electrode assembly for such devices and has as its principal object the provision of a supporting assembly by which an electrode may be positioned centrally of the tube and held in this position.

In the processing of the tubes, and particularly during the bombardment of the electrode and the tube interior, the electrode becomes quite hot and there is danger of breaking the tube if the support gives way and allows the hot electrode to fall over against the tube. The present invention contemplates an electrode assembly and method whereby the electrode when finally secured in the tube is firmly held in a centralized position with respect to the tube.

I will describe the preferred form of the invention by reference to the accompanying drawing wherein.

Figure 1:
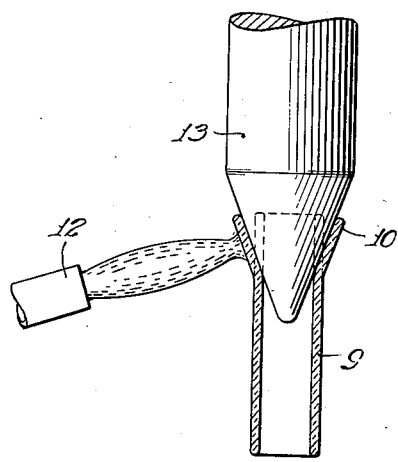
Fig. 1 is a view illustrating the initial step in preparing the electrode assembly.

Referring now to the drawing, the numeral 5 designates an electrode which is of the cylindrical type and which is composed of a suitable metal. This electrode is provided with a substantially conical end portion 6 that is closed upon a lead-in wire 7 by any suitable method such as by the crimp 8 in the metal at the end of the electrode. Numeral 9 refers to a glass tube which is utilized in the electrode assembly and is provided with a flared portion 10 to receive the conical portion 6 of the electrode 5. The entire electrode assembly is to be mounted in a gaseous conduction tube 11, as will be readily understood.

Figure 2:
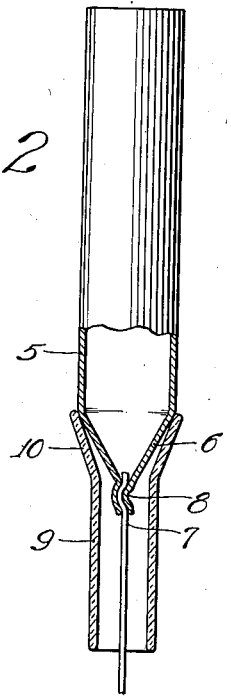
Fig. 2 is a view in longitudinal section through an electrode and its supporting collar illustrating a second step in the assembly.

In preparing the electrode assembly I first provide a tube 9 with the flared end 10 in the manner shown in Fig. 1 where a burner 12 is used to heat and soften the end of the tube 9, and a pointed tool 13 is applied to form the conical portion 10. It will be noted that the shape of the conical portion 10 is such that when the electrode 5 is seated therein, as shown in Fig. 2, it rests near the tip of the conical portion 10 which provides adequate support adjacent the widest part of the conical surface 6 of the electrode.

Figure 3:
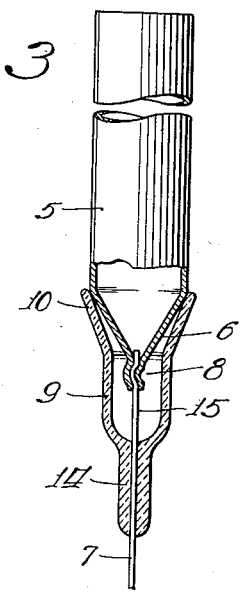
Fig. 3 is a view like Fig. 2 illustrating a third step in the assembly.
Figure 4:
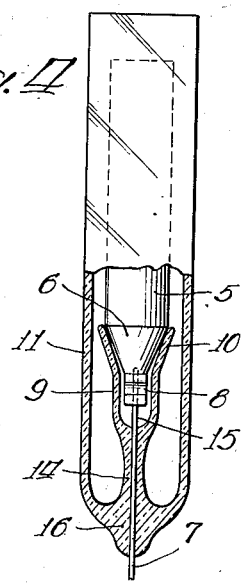
Fig. 4 is a view partly in section and partly in side elevation illustrating the final assembly of the electrode within a tube.

The lead-in wire 7 is attached to the electrode 5 before the electrode is heated in the tube 9. This lead-in wire is of a type that has been treated so that it can be readily seated in glass. For example, I use iron wire having a copper borate coating known in the trade as "Dumet." With the electrode seated in the conical portion 10, and the lead-in wire 7 drawn down to hold it firmly in place, the glass tube 9 is next heated and sealed onto the lead-in wire at 14, as shown in Fig. 3. The portion of the lead-in wire shown at 15 between the seal 14 and the end of the electrode serves to hold the electrode in seated position in the conical part 10 of the glass tube 9. The space between the electrode and the conical portion 9 serves to provide mean free path insulation which protects the lead-in wire portion 15 from the discharge which takes place within the tube. When the electrode assembly is completed, as shown in Fig. 3, it may then be mounted in a tube 11, as shown in Fig. 4, by sealing the part 14 and the lead-in wire 7 to the base 16 of the tube 11.

From the foregoing description it is believed that the advantages of the present invention and the manner in which it is carried out will be readily apparent to those skilled in this art. It is also believed to be obvious that various minor modifications may be made without departing from the scope of the invention as expressed in the claims.

Having thus described my invention, what I claim as new and desire to secure by Letters Patent is:

1. An electrode assembly for gaseous conduction tubes comprising a cylindrical electrode having a closed end including a tapered portion, a lead-in wire projecting from the closed end of the electrode, a supporting sleeve having a flared end receiving the tapered portion of the electrode and providing a seat therefor, said sleeve and lead-in wire being spaced apart at the end of the electrode and sealed together at a distance from the end of the electrode whereby to hold the electrode seated in said sleeve.

2. An electrode assembly for gaseous conduction tubes comprising a cylindrical electrode having a closed end including a tapered portion, a lead-in wire projecting from the closed end of the electrode, a supporting sleeve having a flared end receiving the tapered portion of the electrode and providing a seat therefor, said sleeve and lead-in wire being spaced apart at the end of the electrode and sealed together at a distance from the end of the electrode whereby to hold the electrode seated in said sleeve, said electrode being tapered at a greater angle with respect to its longitudinal axis than the flared end of the sleeve whereby the contacting surface between the sleeve and the electrode is approximately only at the largest circumference of the electrode.

FRANK KASPAR.